US009390561B2

(12) United States Patent
Brown et al.

(10) Patent No.: US 9,390,561 B2
(45) Date of Patent: Jul. 12, 2016

(54) PERSONAL HOLOGRAPHIC BILLBOARD

(71) Applicant: MICROSOFT TECHNOLOGY LICENSING, LLC, Redmond, WA (US)

(72) Inventors: Cameron G. Brown, Redmond, WA (US); Abby Lee, Seattle, WA (US); Brian J. Mount, Seattle, WA (US); Daniel J. McCulloch, Kirkland, WA (US); Michael J. Scavezze, Bellevue, WA (US); Ryan L. Hastings, Seattle, WA (US); John Bevis, Seattle, WA (US); Mike Thomas, Redmond, WA (US); Ron Amador-Leon, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 146 days.

(21) Appl. No.: 13/862,349

(22) Filed: Apr. 12, 2013

(65) Prior Publication Data
US 2014/0306994 A1    Oct. 16, 2014

(51) Int. Cl.
*G09G 5/32* (2006.01)
*G06T 19/00* (2011.01)
*G02B 27/01* (2006.01)
(Continued)

(52) U.S. Cl.
CPC .......... *G06T 19/006* (2013.01); *G02B 27/0172* (2013.01); *G06F 3/011* (2013.01); *H04N 1/00347* (2013.01); *H04N 1/32101* (2013.01); *G02B 27/017* (2013.01); *G02B 2027/014* (2013.01); *G02B 2027/0178* (2013.01); *G06Q 50/01* (2013.01); *H04N 2201/3245* (2013.01)

(58) Field of Classification Search
None
See application file for complete search history.

(56) References Cited

U.S. PATENT DOCUMENTS

2006/0129451 A1* 6/2006 Kohanim ............... G06Q 30/02
705/14.58
2006/0270419 A1* 11/2006 Crowley ................. H04L 12/58
455/456.2

(Continued)

OTHER PUBLICATIONS

Zhu, et al., "Personalized In-store E-Commerce with the PromoPad: An Augmented Reality Shopping Assistant", In Proceedings of Electronic Journal for E-commerce Tools and Applications, Feb. 2004, 19 pages.

(Continued)

*Primary Examiner* — Barry Drennan
*Assistant Examiner* — Diana Hickey
(74) *Attorney, Agent, or Firm* — Dan Choi; Judy Yee; Micky Minhas

(57) ABSTRACT

Methods for generating and displaying personalized virtual billboards within an augmented reality environment are described. The personalized virtual billboards may facilitate the sharing of personalized information between persons within an environment who have varying degrees of acquaintance (e.g., ranging from close familial relationships to strangers). In some embodiments, a head-mounted display device (HMD) may detect a mobile device associated with a particular person within an environment, acquire a personalized information set corresponding with the particular person, generate a virtual billboard based on the personalized information set, and display the virtual billboard on the HMD. The personalized information set may include information associated with the particular person such as shopping lists and classified advertisements. The HMD may share personalized information associated with an end user of the HMD with the mobile device based on whether the particular person is a friend or unknown to the end user.

18 Claims, 11 Drawing Sheets

(51) Int. Cl.
*G06F 3/01* (2006.01)
*H04N 1/00* (2006.01)
*H04N 1/32* (2006.01)
*G06Q 50/00* (2012.01)

(56) References Cited

U.S. PATENT DOCUMENTS

| | | | | |
|---|---|---|---|---|
| 2009/0289956 | A1* | 11/2009 | Douris | G01C 21/3602 345/633 |
| 2010/0325218 | A1* | 12/2010 | Castro | G06Q 50/01 709/206 |
| 2011/0142016 | A1 | 6/2011 | Chatterjee | |
| 2011/0246064 | A1 | 10/2011 | Nicholson | |
| 2012/0026191 | A1* | 2/2012 | Aronsson | G02B 27/017 345/633 |
| 2012/0113141 | A1 | 5/2012 | Zimmerman | |
| 2012/0154277 | A1* | 6/2012 | Bar-Zeev et al. | 345/158 |
| 2012/0249416 | A1 | 10/2012 | Maciocci et al. | |

OTHER PUBLICATIONS

"Augmented Reality Makes Shopping More Personal", Retrieved on: Sep. 25, 2012, Available at: http://www.research.ibm.com/articles/augmented-reality.shtml.

"We Are Organized Chaos", Published on: Sep. 25, 2012, Available at: http://weareorganizedchaos.com/.

"Issues Monitor", Published on: Sep. 2012, Available at: http://www.kpmg.com/Global/en/IssuesAndInsights/ArticlesPublications/Issues-monitor-retail/Documents/issues-monitor-retail-september-2012.pdf.

"Domino's Pizza Augmented Reality Billboards", Published on: Jan. 5, 2012, Available at: http://creativity-online.com/news/dominos-pizza-augmented-reality-billboards/231912 Pizza Goes Augmented.

Brown, et al., "Interactive Product Browsing and Configuration Using Remote Augmented Reality Sales Services", In International Conference on Service Oriented Computing, Sep. 19, 2012, 13 pages.

"International Search Report & Written Opinion for PCT Patent Application No. PCT/US2014/033405", Mailed Date: Jul. 30, 2014, Filed Date: Apr. 9, 2014, 9 Pages.

"International Preliminary Report on Patentability Issued in PCT Application No. PCT/US2014/033405", Mailed Date: Nov. 12, 2015, 8 Pages.

"Second Written Issued in PCT Application No. PCT/US2014/033405", Mailed Date: Mar. 11, 2015, 4 Pages.

"International Preliminary Report on Patentability Issued in PCT Application No. PCT/US2014/033405", Mailed Date: Jul. 16, 2015, 8 Pages.

* cited by examiner

PERSONAL HOLOGRAPHIC BILLBOARD

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. The objects within an AR environment may include real objects (i.e., objects that exist within a particular real-world environment) and virtual objects (i.e., objects that do not exist within the particular real-world environment).

In order to realistically integrate virtual objects into an AR environment, an AR system typically performs several tasks including mapping and localization. Mapping relates to the process of generating a map of a real-world environment. Localization relates to the process of locating a particular point of view or pose relative to the map of the real-world environment. In some cases, an AR system may localize the pose of a mobile device moving within a real-world environment in real-time in order to determine the particular view associated with the mobile device that needs to be augmented as the mobile device moves within the real-world environment.

SUMMARY

Technology is described for generating and displaying personalized virtual billboards within an augmented reality environment. The personalized virtual billboards may facilitate the sharing of personalized information between persons within an environment who have varying degrees of acquaintance (e.g., ranging from close familial relationships to strangers). In some embodiments, a head-mounted display device (HMD) may detect a mobile device associated with a particular person within an environment, acquire a personalized information set corresponding with the particular person, generate a virtual billboard based on the personalized information set, and display the virtual billboard on the HMD. The personalized information set may include information associated with the particular person such as shopping lists and classified advertisements. The HMD may share personalized information associated with an end user of the HMD with the mobile device based on whether the particular person is a friend or unknown to the end user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
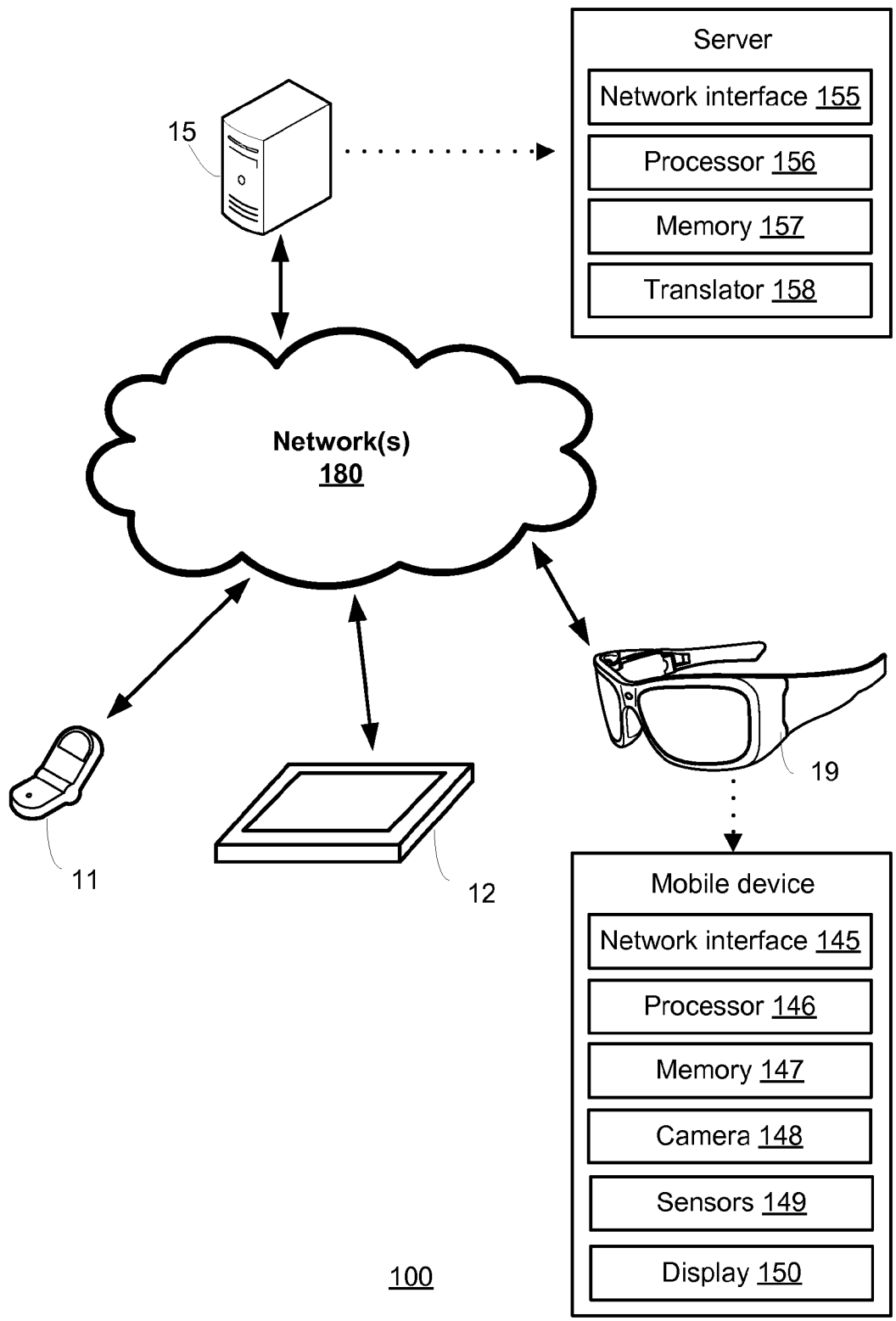
FIG. 1 is a block diagram of one embodiment of a networked computing environment in which the disclosed technology may be practiced.

Technology is described for generating and displaying personalized virtual billboards within an augmented reality environment. The personalized virtual billboards may facilitate the sharing of personalized information between persons within an environment who have varying degrees of acquaintance (e.g., ranging from close familial relationships to strangers). In some embodiments, a head-mounted display device (HMD) may detect a mobile device associated with a particular person within an environment, acquire a personalized information set corresponding with the particular person from the mobile device, generate a virtual billboard based on the personalized information set, and display the virtual billboard on the HMD. The personalized information set may include information associated with the particular person such as shopping lists, classified advertisements, personal advertisements, languages spoken, age, relationship status, allergies, and blood type. In some cases, the HMD may share personalized information associated with an end user of the HMD with the mobile device based on a classification level of the particular person (e.g., whether the particular person is a close friend or unknown to the end user). The position of the virtual billboard as viewed by the end user of the HMD may be determined based on a location of the particular person (e.g., the virtual billboard may hover over the particular person or to the side of the particular person) and/or the presence of another person within a field of view of the HMD (e.g., the virtual billboard may be placed such that it does not obstruct a view of the other person's face).

In some embodiments, personalized information associated with an online dating service, an online social networking service, and/or an online classified advertisement service may be shared with others in real-time who are within a particular distance of the HMD (e.g., within 100 meters) and searched in order to find matching persons within the particular distance who satisfy certain searching criteria (e.g., a person who speaks Spanish, is single, and has studied an engineering discipline). Upon finding a successful match, a virtual billboard may be displayed within a field of view of the HMD associated with a person matching the searching criteria. In one example, the personalized information may derive from online activity such as posts to message boards and/or social networking websites (e.g., a post to a message board for an online dating service regarding whether anyone is interested in attending a concert).

In some cases, a person may be looking for something or someone in particular (e.g., a bicycle, a sweater, or another person with particular interests), but not know exactly where to find it or who can help them find it. In one example, a person may be shopping for a navy blue crewneck sweater as they enter a clothing store and browse the clothing store looking for the sweater. If the person spends too much time looking, they may become discouraged and leave the store. In another example, a person interested in acquiring a new mountain bike may pass by another person on the street who is looking to sell a mountain bike. However, as the two persons may not know each other or know that they are both looking to exchange a similar item, the two persons may not communicate with each other regarding the similar item. Thus, there is a need to facilitate the real-time sharing of personalized information between persons within proximity to each other who have varying degrees of acquaintance.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file may be a translated version of the first file). Translator 158 may be configured using file mapping instructions that provide instructions for mapping files of a first file format (or portions thereof) into corresponding files of a second file format.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images. Sensors 149 may generate motion and/or orientation information associated with mobile device 19. In some cases, sensors 149 may comprise an inertial measurement unit (IMU). Display 150 may display digital images and/or videos. Display 150 may comprise a see-through display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment to an end user of the HMD (e.g., for controlling applications running on the HMD). The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on mobile device 19 (i.e., on the client side). The virtual objects may include a text description associated with a real-world object.

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the one or more virtual objects may be manipulated or controlled by an end user of the mobile device using hand and/or finger gestures.

In some embodiments, personalized information associated with an end user of an HMD is shared in real-time with a mobile device within a particular distance of the HMD (e.g., if the mobile device is within 10 meters of the HMD). The mobile device may be used by a particular person (e.g., the mobile device may comprise an HMD worn by the particular person). The particular person may be identified by capturing images using the HMD and applying facial recognition techniques to the images. The particular person may also be identified via a device identifier associated with the mobile device. The HMD may generate and share personalized information associated with the end user based on a classification level of the particular person. In one example, if the particular person is classified as a close friend, then the personalized information may include private information such as the address of where the end user lives. If the particular person is classified as a stranger, then the personalized information may include only publicly available information (or information that the end user has approved of being available to members of the public). If the particular person is classified as a paramedic or medical personnel, then the personalized information may include medical information associated with the end user such as their blood type, known allergies, and current drug prescriptions.

In some cases, the classification level may be associated with customized privacy and security settings set by an end user of an HMD. For example, the end user may specify which group of people can see particular personalized information or content associated with the end user. The end user may also specify time periods during which the particular personalized information may be viewed by the group of people. In one example, a group of coworkers may only be able to view personal phone number information during daytime hours. In another example, a person within a particular distance of the end user of the HMD identified as one of a group of close friends may hear a personalized audio message (e.g., a good morning message) during the hours of 7 a.m. and 9 a.m.

Figure 2A:
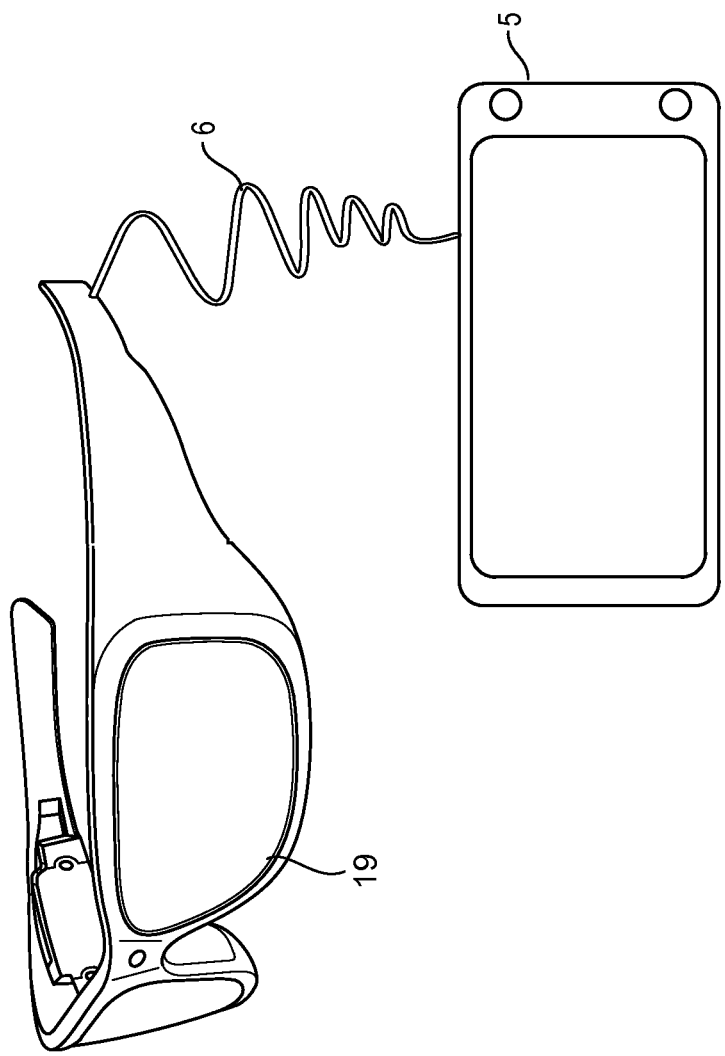
FIG. 2A depicts one embodiment of a mobile device in communication with a second mobile device.

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection. In one example, an HMD worn by an end user of the HMD may wirelessly communicate with a second mobile device (e.g., a mobile phone used by the end user) within a proximity of the end user (e.g., the second mobile device may be in a coat pocket). Mobile device 5 may be used by mobile device 19 in order to offload compute intensive processing tasks (e.g., the rendering of virtual objects and/or the recognition of gestures) and to store information (e.g., models of virtual objects) that may be used to provide an augmented reality environment on mobile device 19 (e.g., used by the end user for controlling applications running on the mobile device). Mobile device 19 may provide motion and/or orientation information associated with mobile device 19 to mobile device 5. In one example, the motion information may include a velocity or acceleration associated with the mobile device 19 and the orientation information may include Euler angles, which provide rotational information around a particular coordinate system or frame of reference. In some cases, mobile device 19 may include a motion and orientation sensor, such as an inertial measurement unit (IMU), in order to acquire motion and/or orientation information associated with mobile device 19.

Figure 2B:
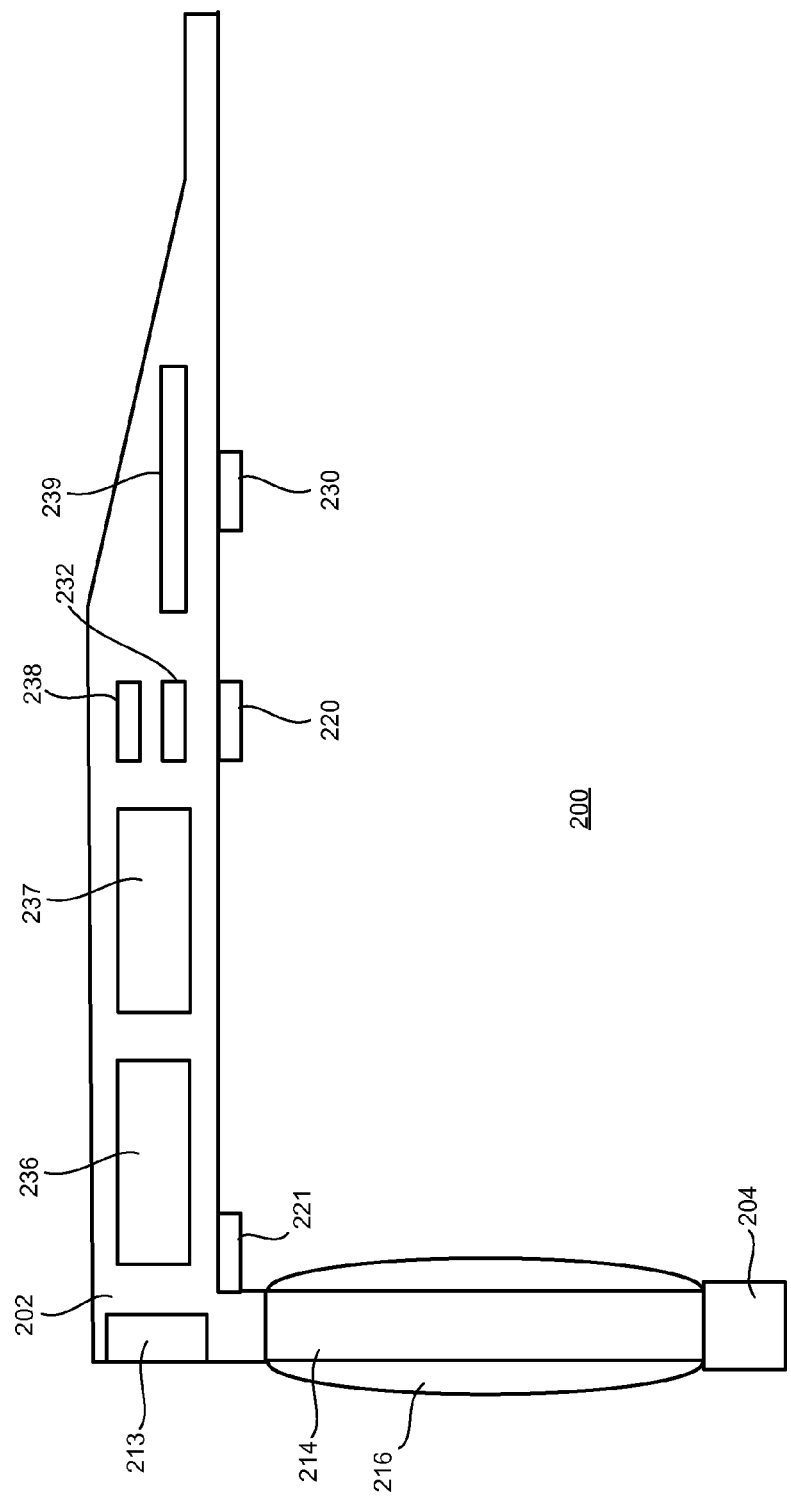
FIG. 2B depicts one embodiment of a portion of an HMD.

FIG. 2B depicts one embodiment of a portion of an HMD, such as mobile device 19 in FIG. 1. Only the right side of an HMD 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The one or more cameras may include one or more image sensors (e.g., a CCD image sensor or a CMOS image sensor). The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include an inward facing camera. In another embodiment, the eye tracking system 221 may comprise an eye tracking illumination source and an associated eye tracking IR sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011, both of which are herein incorporated by reference.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a field of view. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 3:
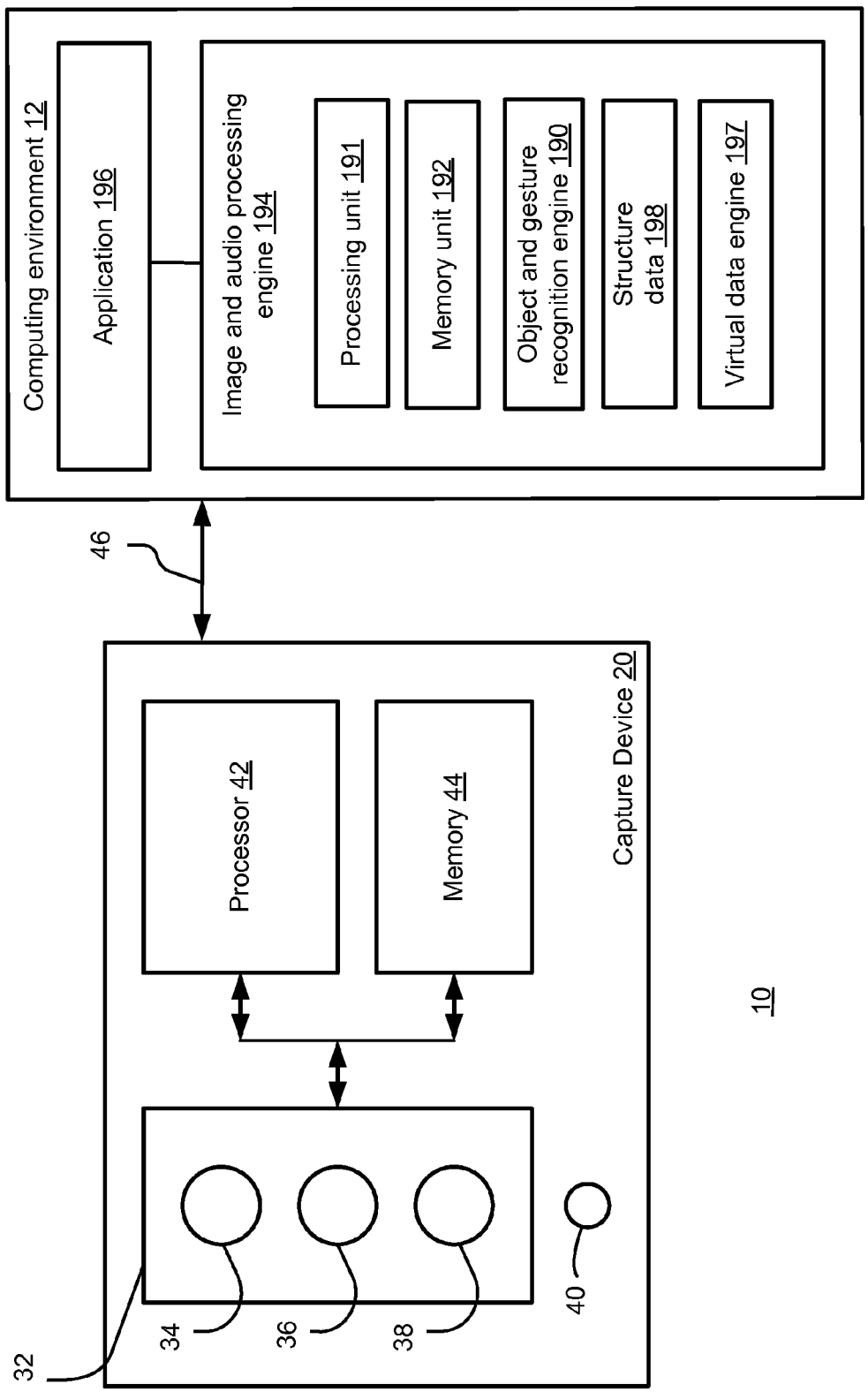
FIG. 3 depicts one embodiment of a mobile device including a capture device and computing environment.

FIG. 3 depicts one embodiment of a computing system 10 including a capture device 20 and computing environment 12. In some embodiments, capture device 20 and computing environment 12 may be integrated within a single mobile computing device. The single integrated mobile computing device may comprise a mobile device, such as mobile device 19 in FIG. 1. In one example, the capture device 20 and computing environment 12 may be integrated within an HMD. In other embodiments, capture device 20 may be integrated with a first mobile device, such as mobile device 19 in FIG. 2A, and computing environment 12 may be integrated with a second mobile device in communication with the first mobile device, such as mobile device 5 in FIG. 2A.

In one embodiment, the capture device 20 may include one or more image sensors for capturing images and videos. An image sensor may comprise a CCD image sensor or a CMOS image sensor. In some embodiments, capture device 20 may include an image sensor and/or an IR CMOS image sensor. The capture device 20 may include an image camera component 32. The image camera component 32 may include an IR light component 34, a depth camera 36, and an RGB camera 38 that may be used to capture the depth image of a capture area. In one example, the IR light component 34 of the capture device 20 may emit an infrared light into the capture area and may then use sensors to detect the backscattered light from the surface of one or more objects in the capture area using the color and/or IR light sensing components within the image camera component 32. In some embodiments, pulsed infrared light may be used such that the time between an outgoing light pulse and a corresponding incoming light pulse may be measured and used to determine a physical distance from the capture device 20 to a particular location on the one or more objects in the capture area. Capture device 20 may also include optics for producing collimated light and/or for diffusing light (e.g., an optical diffuser for spreading light from an IR light source that generates a narrow beam of light) for illuminating an environment.

As depicted in FIG. 3, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor 42 may include a standardized processor, a specialized processor, a microprocessor, or the like. The processor 42 may execute instructions that may include instructions for receiving and analyzing images and/or determining whether a particular gesture has occurred (e.g., end user gestures for controlling or manipulating a virtual object). It is to be understood that at least some image analysis and/or gesture recognition operations may be executed by processors contained within one or more capture devices such as capture device 20.

The capture device 20 may include a memory 44 that may store the instructions that may be executed by the processor 42 and images (or frames of images) captured by the light sensing components of the image camera component 32. In one example, the memory 44 may include random access memory (RAM), read only memory (ROM), cache, Flash memory, a non-volatile memory, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 may be housed in a single housing.

The capture device 20 may be in communication with the computing environment 12 via a communication link 46. The communication link 46 may be a wired connection or a wireless connection such as a wireless 802.11b, g, a, or n connection. In one embodiment, the capture device 20 may provide the images captured by, for example, the depth camera 36 and/or the RGB camera 38 to the computing environment 12 via the communication link 46.

As depicted in FIG. 3, computing environment 12 includes image and audio processing engine 194 in communication with application 196. Application 196 may comprise an operating system application or other computing application such as a gaming application, a messaging application, or an application for generating an augmented reality environment. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190.

Virtual data engine 197 processes virtual objects and registers the position and orientation of virtual objects in relation to various maps of a real-world environment stored in memory unit 192. The virtual data engine may also render images associated with virtual objects for display to an end user of computing system 10. In some embodiments, the computing system 10 may use images acquired from the capture device 20 to determine a six degree of freedom (6 DOF) pose corresponding with the images relative to a 3D map of an environment. In one example, a 6 DOF pose may comprise information associated with the position and orientation of a mobile device (e.g., an HMD) within the environment. The 6 DOF pose may be used for localizing a mobile device and to generate images of virtual objects such that the virtual objects appear to exist at appropriate locations within an augmented reality environment. More information regarding determining a 6DOF pose can be found in U.S. patent application Ser. No. 13/152,220, "Distributed Asynchronous Localization and Mapping for Augmented Reality," incorporated herein by reference in its entirety. More information regarding performing pose estimation and/or localization for a mobile device can be found in U.S. patent application Ser. No. 13/017,474, "Mobile Camera Localization Using Depth Maps," incorporated herein by reference in its entirety.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., a pencil held by an end user of an HMD) and facial recognition may be used to detect the face of a particular person within an environment. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structural data 198 while performing object recognition. Structure data 198 may include structural information about targets and/or objects to be tracked. For example, a skeletal model of a human may be stored to help recognize body parts (e.g., arms, hands, and/or fingers). In another example, structure data 198 may include structural information regarding one or more inanimate objects in order to help recognize the one or more inanimate objects (e.g., a pencil or stylus).

The image and audio processing engine 194 may also utilize object and gesture recognition engine 190 while performing gesture recognition. In one example, object and gesture recognition engine 190 may include a collection of gesture filters, each comprising information concerning a gesture that may be performed. The object and gesture recognition engine 190 may compare the data captured by capture device 20 to the gesture filters in a gesture library to identify when a user has performed one or more gestures. In one example, image and audio processing engine 194 may use the object and gesture recognition engine 190 to detect the performance of a particular gesture performed by an end user of the computing system 10 (e.g., a gesture to manipulate or control virtual objects within an augmented reality environment). In one embodiment, the object and gesture recognition engine 190 may utilize machine learning classification techniques.

Figure 4A:
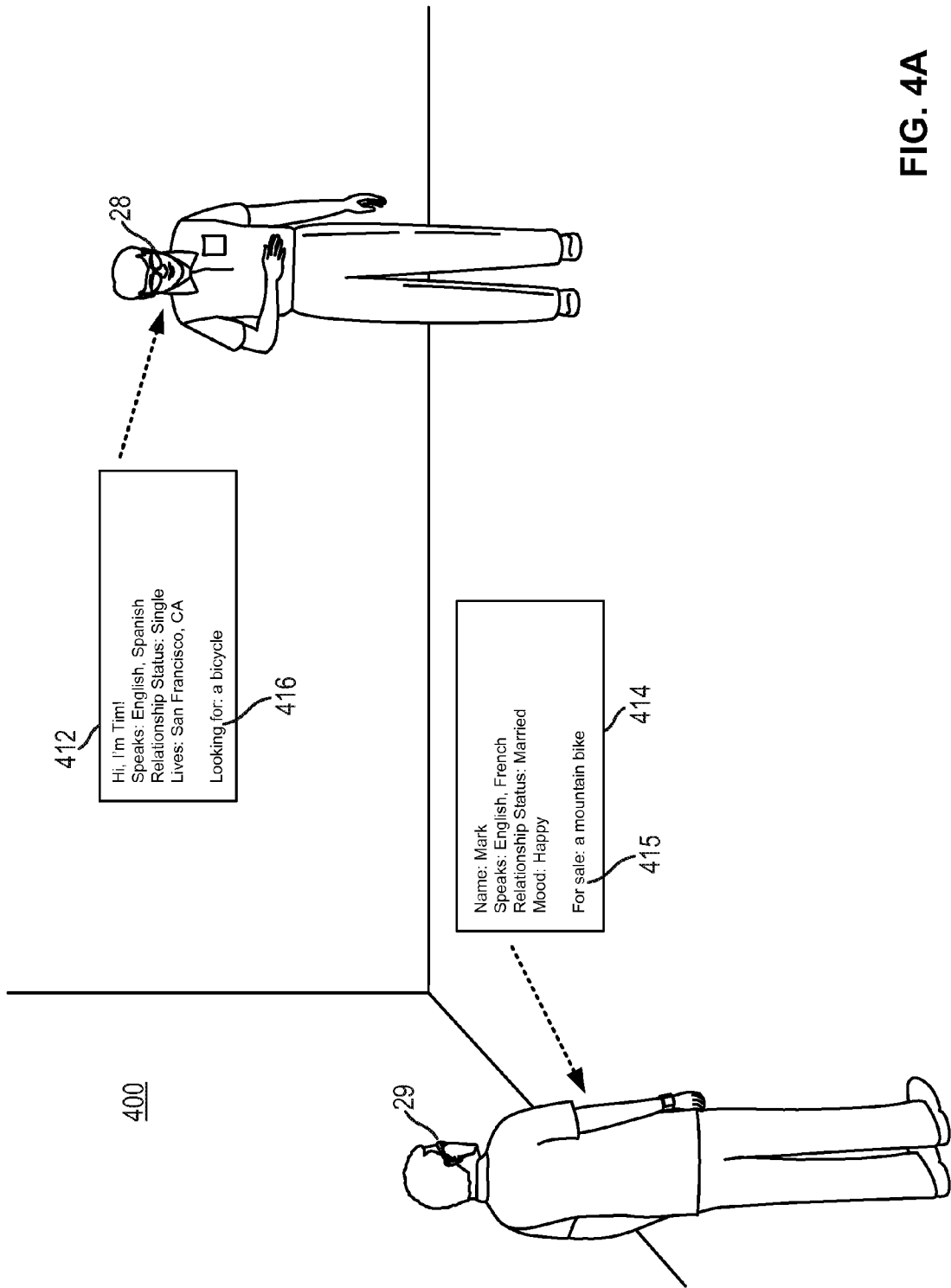
FIG. 4A depicts one embodiment of an augmented reality environment in which one or more virtual billboards may be displayed.
Figure 4B:
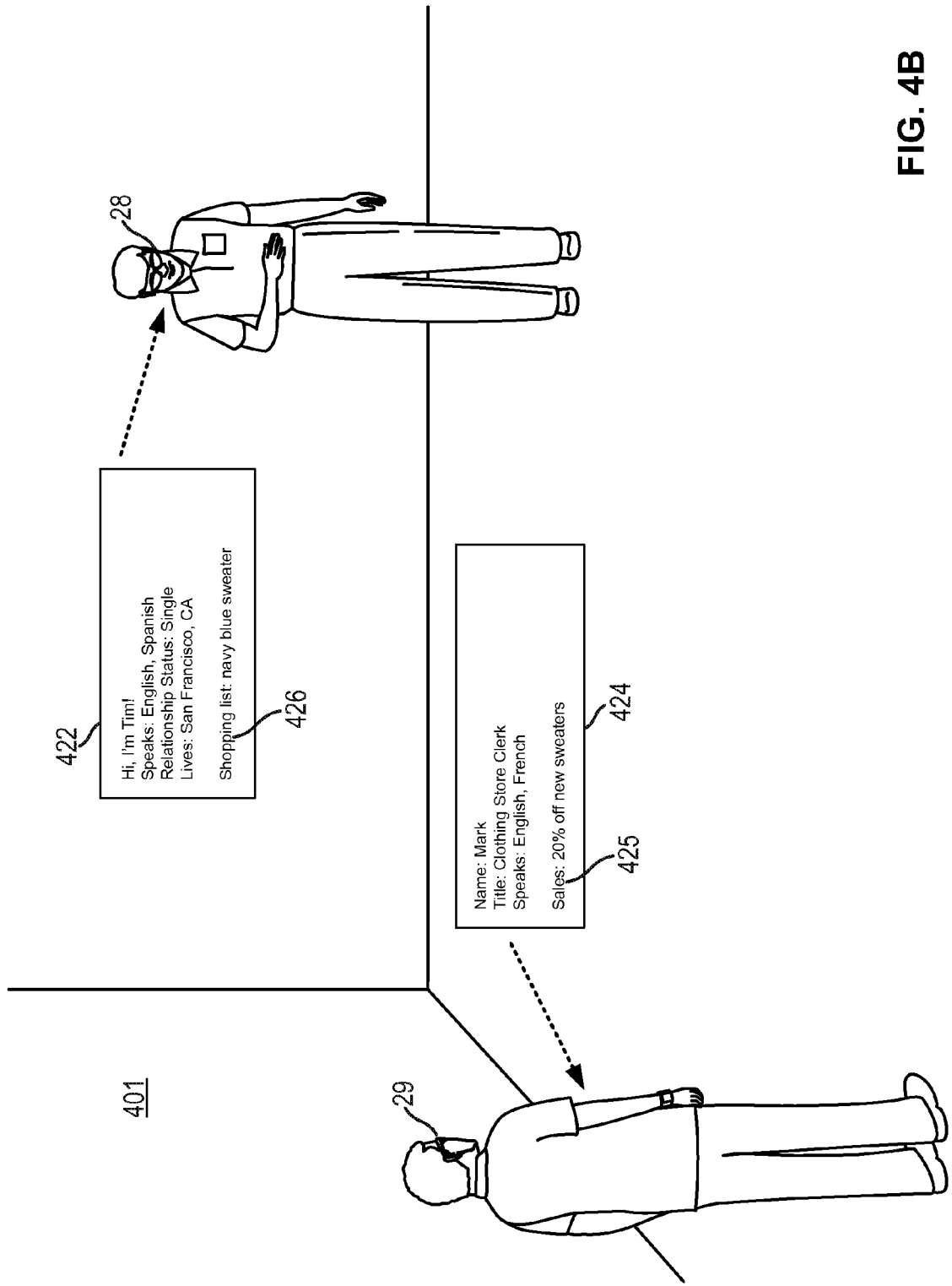
FIG. 4B depicts one embodiment of an augmented reality environment in which one or more virtual billboards may be displayed.
Figure 4C:
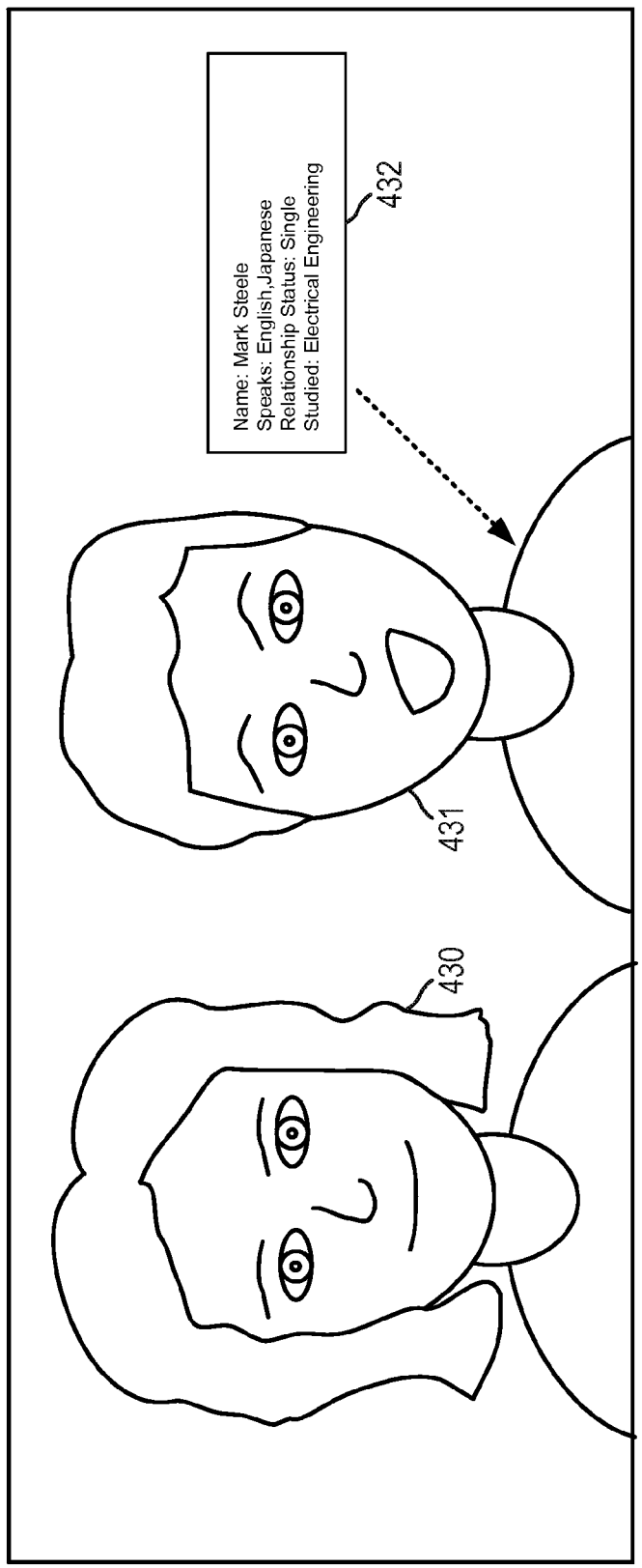
FIG. 4C depicts one embodiment of an augmented reality environment as viewed using an HMD.

FIGS. 4A-4C provide examples of various augmented reality environments in which one or more virtual billboards (or holographic displays) associated with different people within an environment may be generated and displayed to an end user of an HMD. The position of the one or more virtual billboards as viewed by the end user of the HMD may be determined based on a location of a particular person within the environment (e.g., a virtual billboard may hover over the particular person or to the side of the particular person) and/or the presence of other persons within a field of view of the HMD (e.g., a virtual billboard may be placed such that it does not obstruct a view of another person's face while they are in a conversation with the end user).

FIG. 4A depicts one embodiment of an augmented reality environment 400 in which one or more virtual billboards may be displayed. As depicted, augmented reality environment 400 includes a first person associated with a first mobile device 29 and a second person associated with a second mobile device 28. As viewed by the second person using the second mobile device 28, a first virtual billboard 414 may be displayed to the second person including a first set of personalized information including a name of the first person ("Mark"), languages spoken by the first person ("English and French"), a relationship status of the first person ("married"), a mood of the first person ("happy"), and a first online classified advertisement 415 listed by the first person (i.e., the sale of a mountain bike). As viewed by the first person using the first mobile device 29, a second virtual billboard 412 may be displayed to the first person including a second set of personalized information including a personalized message from the second person ("Hi, I'm Tim!"), languages spoken by the second person ("English and Spanish"), a relationship status of the second person ("single"), a location of where the second person lives ("San Francisco, Calif."), and a second online classified advertisement 416 listed by the second person (i.e., the second person is looking to acquire a bicycle).

In one embodiment, the second online classified advertisement 416 may be viewed by the first person using the first mobile device 29 if the first person uses the same online classified advertisement service as the second person. In some cases, the second online classified advertisement 416 may be displayed on the first mobile device 29 if the second online classified advertisement 416 matches (e.g., via a keyword search) items sought for by the first person.

In one embodiment, the second virtual billboard 412 may display to the first person a common language spoken by the second person if the common language is spoken by the first person (e.g., the second virtual billboard 412 may provide notice that the second person speaks English or another language if the first person also speaks English or another language).

In one embodiment, the location of the second virtual billboard 412 within the augmented reality environment 400 may be shared by both the first mobile device 29 and the second mobile device 28 such that both the first person associated with the first mobile device 29 and the second person associated with the second mobile device 28 perceive that the second virtual billboard 412 exists at the same location within the augmented reality environment. In this case, if the first person points towards the second virtual billboard 412, the second person may understand that the first person is pointing towards the second virtual billboard 412.

In some cases, the virtual billboard 412 may be associated with a sound effect, music, or a customized audio stream. For example, whenever the second virtual billboard 412 is viewable by the first person within the augmented reality environment 400, the first mobile device 29 may play a particular sound effect or song.

FIG. 4B depicts one embodiment of an augmented reality environment 400 in which one or more virtual billboards may be displayed. As depicted, augmented reality environment 400 includes a first person associated with a first mobile device 29 and a second person associated with a second mobile device 28. As viewed by the second person using the second mobile device 28, a first virtual billboard 424 may be displayed to the second person including a first set of personalized information including a name of the first person ("Mark"), a title associated with the first person ("clothing store clerk"), languages spoken by the first person ("English and French"), and user specific information 425 for display to the second person (i.e., that there is a 20% off sale on new sweaters). In one embodiment, the user specific information 425 may be transmitted to the second mobile device 28 from the first mobile device 29 if a triggering event based on information provided to the first mobile device 29 from the second mobile device 28 has occurred. The triggering event may comprise that the second person is looking for a particular item such as a sweater.

As viewed by the first person using the first mobile device 29, a second virtual billboard 422 may be displayed to the first person including a second set of personalized information including a personalized message from the second person ("Hi, I'm Tim!"), languages spoken by the second person ("English and Spanish"), a relationship status of the second person ("single"), a location of where the second person lives ("San Francisco, Calif."), and a shopping list item 426 (i.e., a navy blue sweater). In one embodiment, the shopping list item 426 may be transmitted from the second mobile device 28 to the first mobile device 29 if the first person is identified as a clothing store clerk (e.g., as identified in a virtual billboard associated with the first person). The shopping list item 426 may be displayed to the clothing store clerk as part of a virtual billboard that is locked to or appears within a fixed distance of the second person. For example, the virtual billboard may appear within a fixed radius of two meters from the second person. In other embodiments, the shopping list item 426 may be broadcast or transmitted to any device within proximity to the second mobile device 28. In one example, the shopping list item 426 may be transmitted to a server located at a clothing store or to any mobile computing device located within the clothing store (e.g., a shopping list may be transmitted to mobile devices associated with other customers in the clothing store). In this case, a clothing store clerk or another customer within the clothing store who has information associated with the shopping list item 426 may receive notification that the second person associated with the second mobile device 28 is shopping for a particular item on a shopping list (i.e., a navy blue sweater).

FIG. 4C depicts one embodiment of an augmented reality environment as viewed using an HMD. As depicted, the augmented reality environment includes a first person 430, a second person 431, and a virtual billboard 432 associated with the second person 431. The virtual billboard 432 includes personalized information associated with the second person 431 including a name of the second person 431 ("Mark Steele"), languages spoken by the second person 431 ("English and Japanese"), a relationship status of the second person 431 ("single"), and an area of study or interest ("electrical engineering"). In one embodiment, while an end user of the HMD is at a party or other grouping of persons, the HMD may acquire virtual billboards for one or more persons of the grouping of persons and search the virtual billboards for certain searching criteria (e.g., persons who speak Spanish, are single, and have studied an engineering discipline). Subsequently, the virtual billboards satisfying the searching criteria may be displayed to the end user of the HMD. In one example, a virtual billboard associated with the second person 431 may be displayed to the end user of the HMD because it satisfies one or more searching criteria, while a virtual billboard associated with the first person 430 is not displayed to the end user of the HMD because it does not satisfy one or more searching criteria. In one embodiment, a virtual billboard associated with a particular person within an environment may be displayed to the end user of the HMD only when the particular person is within a field of view of the HMD. In another embodiment, a virtual billboard associated with a particular person may be displayed to the end user of the HMD only if the particular person is within a particular distance of the HMD (e.g., within 20 meters).

In some embodiments, the position of the virtual billboard 432 as viewed by the end user of the HMD may be determined based on a location of the second person 431 (e.g., the virtual billboard 432 may hover to the side of the second person 431 or may hover over the head of the second person 431). In some cases, a virtual billboard may comprise a virtual name tag virtually located on a shirt or a coat of the second person 431. Moreover, the position of the virtual billboard 432 may be adjusted based on the presence of another person within a field of view of the HMD (e.g., the virtual billboard 432 may be placed such that it does not obstruct a view of the face of the first person 430). In one embodiment, the virtual billboard 432 may be positioned within the field of view of the HMD such that it does not obstruct the view of a person engaged in a conversation with the end user of the HMD. For example, the end user of the HMD may be a teacher looking out into a crowded lecture hall and the virtual billboard 432 may be positioned such that a view of one of the students in the lecture hall engaging in a conversation with the end user is not obstructed. A particular direction associated with the person engaged in the conversation with the end user may be determined using sound source localization techniques. Sound source localization may be used to localize the direction of a sound source by detecting time differences in the arrival time of different sounds (due to the speed of sound) being captured by a plurality of microphones associated with the HMD. In some cases, a directional microphone (e.g., utilizing sound source localization and beamforming techniques) may be used to determine the direction associated with the person engaged in the conversation with the end user of the HMD.

Figure 5A:
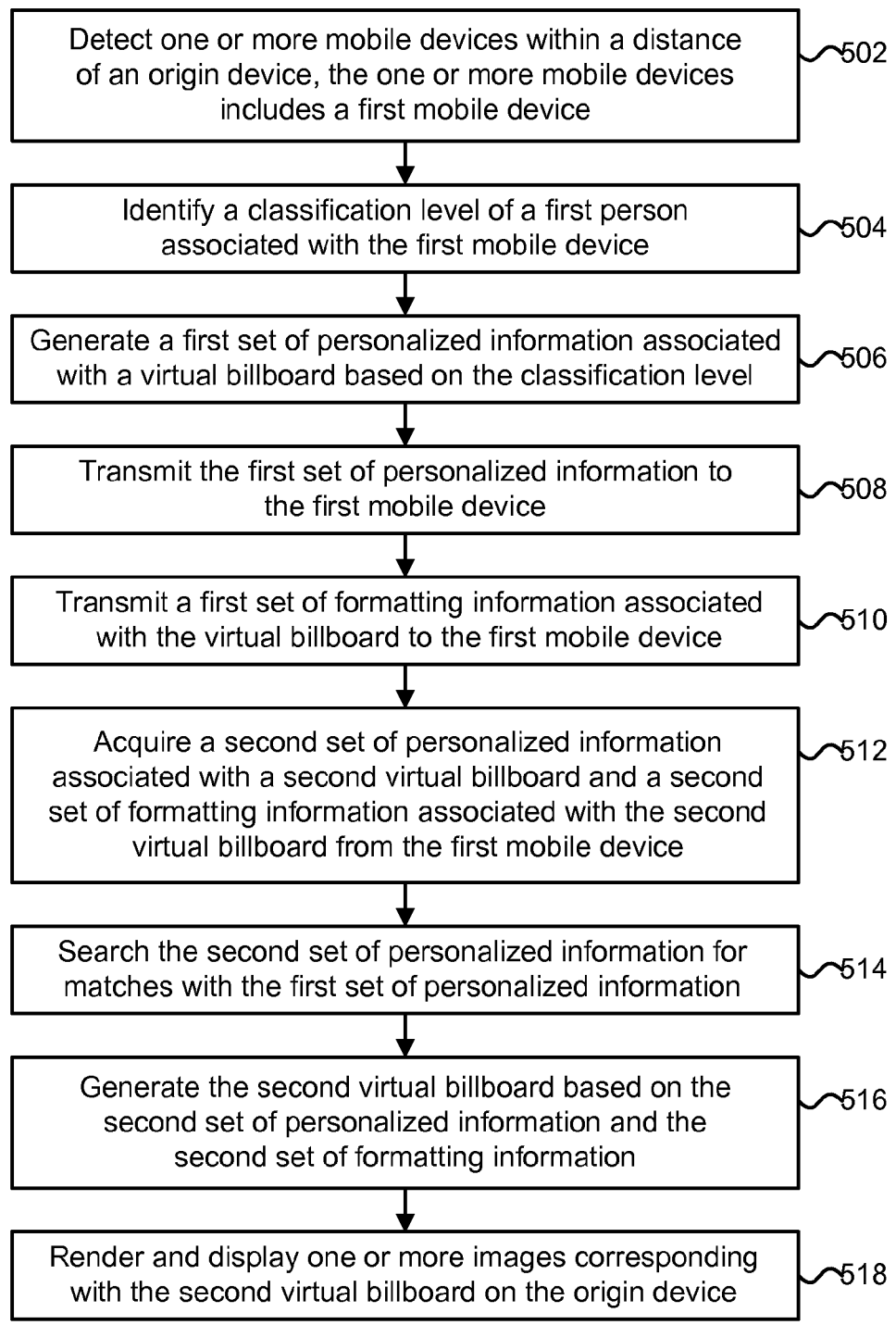
FIG. 5A is a flowchart describing one embodiment of a method for generating and displaying personalized virtual billboards within an augmented reality environment.

FIG. 5A is a flowchart describing one embodiment of a method for generating and displaying personalized virtual billboards within an augmented reality environment. In one embodiment, the process of FIG. 5A may be performed by a mobile device, such as mobile device 19 in FIG. 1.

In step 502, one or more mobile devices are detected within a distance of an origin device. The origin device may comprise an HMD. The one or more mobile devices may include a first mobile device. The first mobile device may comprise a mobile phone or another HMD associated with a particular person within a distance of the origin device (e.g., within 10 meters of the origin device). The first mobile device may be detected within the distance of the origin device via GPS coordinates associated with the first mobile device, or via image recognition of the particular person within a field of view of the HMD and corresponding depth information associated with the particular person captured by the origin device. In one embodiment, the first mobile device may correspond with a particular device identifier and be located within a wireless range of the origin device.

In some embodiments, the first mobile device may be detected by identifying the particular person associated with the first mobile device within a field of view of an HMD in combination with receiving wireless communication from the first mobile device. In one example, images of the field of view of the HMD may be captured using a capture device, such as capture device 20 in FIG. 3, and facial recognition techniques may be applied to the images in order to identify the particular person within the field of view of the HMD. Once the particular person has been identified, the distance to a corresponding mobile device may be determined (or inferred) by acquiring depth information associated with the particular person from the images.

In step 504, a classification level of a first person associated with the first mobile device is identified. A lookup table or end user profile stored on the origin device may map an identification of the first person to one or more classification levels. The classification level of the first person may correspond with a degree of acquaintance that the first person has with an end user of the origin device (e.g., whether the first person is a close friend of the end user of the HMD or is unknown to the end user of the HMD). In some embodiments, a virtual billboard may be generated and displayed on an HMD only if the classification level of the first person indicates that the first person is a friend or close friend.

In step 506, a first set of personalized information associated with a virtual billboard is generated based on the classification level. In step 508, the first set of personalized information is transmitted to the first mobile device. In some embodiments, the classification level may be used to filter personalized information transmitted to other devices within a distance of the origin device. In one example, if the first person is classified as a close friend, then the first set of personalized information may include private information such as the address of where the end user lives or private calendar entries. If the first person is classified as a stranger, then the first set of personalized information may include only publicly available information (or information that the end user has approved of being available to members of the public). If the first person is classified as a paramedic or medical personnel, then the first set of personalized information may include medical information associated with the end user such as their blood type, known allergies, and current drug prescriptions.

In step 510, a first set of formatting information associated with the virtual billboard is transmitted to the first mobile device. The first set of formatting information may dictate to the first mobile device how the virtual billboard should be displayed on the first mobile device or specify display parameters associated with the display of the virtual billboard on the first mobile device. In one example, the first set of formatting information may provide that the virtual billboard hover around or within a specified distance of the end user of the HMD as viewed by the first person using the first mobile device. In another example, the first set of formatting information may provide that the virtual billboard be locked to a location (or appear fixed) within a field of view of the first mobile device regardless of where the origin device is located within an environment (e.g., the virtual billboard may be located within a region of the field of view of the first mobile device designated for augmented reality notices).

In step 512, a second set of personalized information associated with a second virtual billboard is acquired from the first mobile device. A second set of formatting information associated with the second virtual billboard may also be acquired from the first mobile device. The second virtual billboard may include personalized information associated with the first person. For example, the second set of formatting information may include information associated with the first person such as shopping lists, classified advertisements, personal advertisements, languages spoken, age, relationship status, allergies, and blood type.

In step 514, the second set of personalized information is searched for matches with the first set of personalized information. In one embodiment, a keyword search is performed on the second set of personalized information based on information contained within the first set of personalized information. In another embodiment, a keyword search is performed on the second set of personalized information based on a list of keywords stored in a user profile associated with the end user of the origin device. Keyword matches may be highlighted within the second virtual billboard. In some embodiments, the second set of personalized information may be searched subject to searching criteria. The searching criteria may include items sought for by the end user of the origin device. The searching criteria may include characteristics of people sought for by the end user of the origin device (e.g., a person who speaks Spanish, is single, and has studied an engineering discipline). In some cases, the second virtual billboard may be displayed on the origin device only if one or more keyword matches are found or if one or more searching criteria are satisfied. The searching criteria may be generated based on the classification level of the first person.

In step 516, the second virtual billboard is generated based on the second set of personalized information and the second set of formatting information. In step 518, one or more images corresponding with the second virtual billboard are rendered and displayed on the origin device. The one or more images corresponding with the second virtual billboard may be rendered and displayed such that the second virtual billboard is perceived to exist within an augmented reality environment displayed to the end user of the origin device.

Figure 5B:
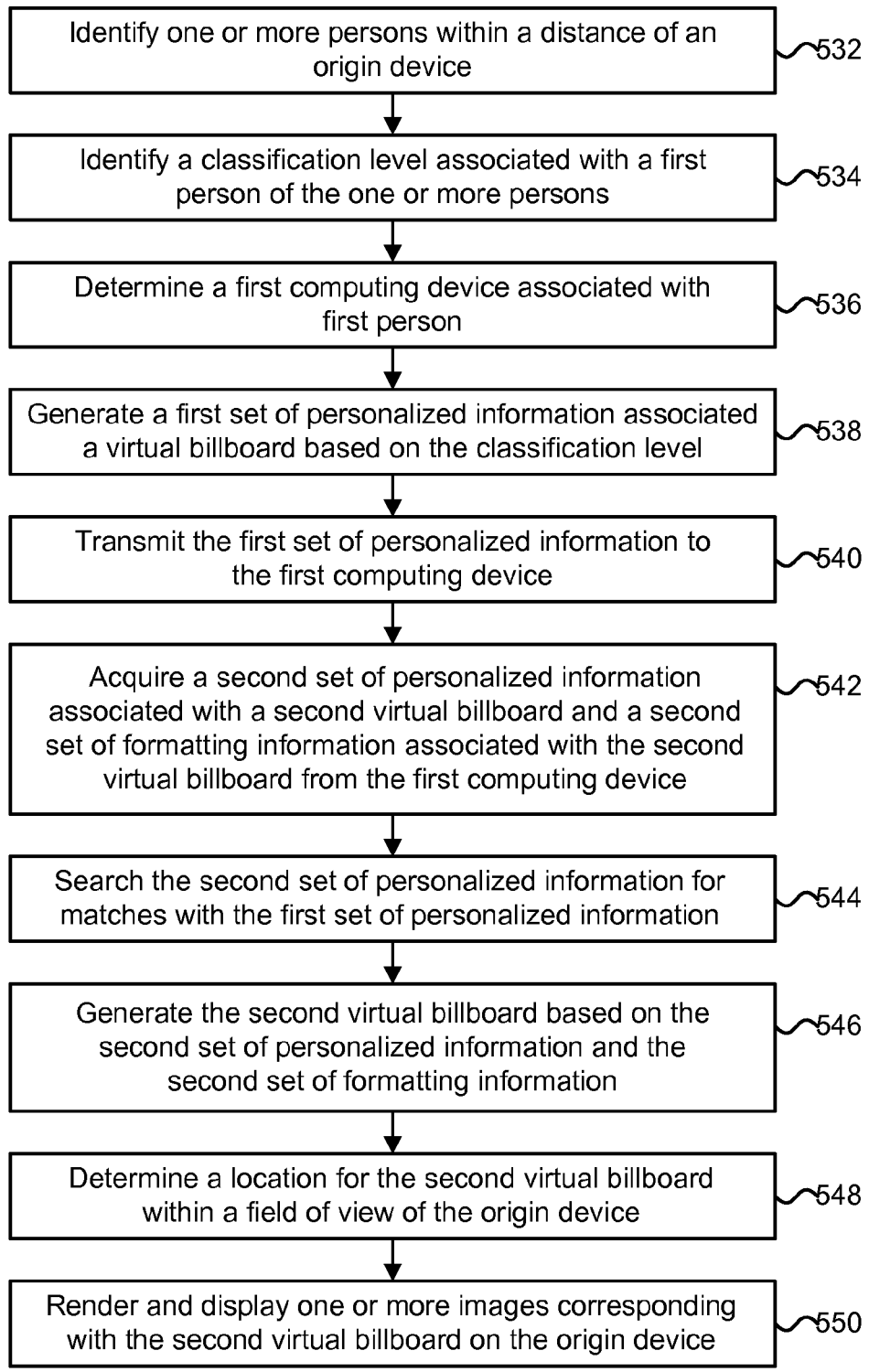
FIG. 5B is a flowchart describing one embodiment of a method for generating and displaying personalized virtual billboards within an augmented reality environment.

FIG. 5B is a flowchart describing one embodiment of a method for generating and displaying personalized virtual billboards within an augmented reality environment. In one embodiment, the process of FIG. 5B may be performed by a mobile device, such as mobile device 19 in FIG. 1.

In step 532, one or more persons are identified within a distance of an origin device. The origin device may comprise an HMD or a mobile phone. The one or more persons may be identified via facial recognition techniques applied to images captured using the origin device. For example, images corresponding with a field of view of an HMD may be captured using a capture device, such as capture device 20 in FIG. 3, and facial recognition techniques may be applied to the images in order to identify the one or more persons within the field of view of the HMD. In some cases, a particular person may be identified by recognizing a specific fiduciary marker or tag worn by the particular person (e.g., the particular person may wear a shirt that displays a barcode or personal identification tag). Once a particular person of the one or more persons has been identified, a distance to the particular person may be determined by acquiring depth information from the images.

In step 534, a classification level associated with a first person of the one or more persons is identified. The classification level of the first person may correspond with a degree of acquaintance that the first person has with an end user of the origin device (e.g., whether the first person is a close friend of the end user of the HMD or is unknown to the end user of the HMD).

In step 536, a first computing device associated with the first person is determined. The first computing device may correspond with a mobile device or another HMD used by the first person. In step 538, a first set of personalized information associated with a virtual billboard is generated based on the classification level. In step 540, the first set of personalized information is transmitted to the first computing device. In some embodiments, the classification level may be used to filter personalized information transmitted to other devices within a distance of the origin device. In one example, if the first person is classified as a close friend, then the first set of personalized information may include private information such as the address of where the end user lives. If the first person is classified as a stranger, then the first set of personalized information may include only publicly available information (or information that the end user has approved of being available to members of the public). If the first person is classified as a paramedic or medical personnel, then the first set of personalized information may include medical information associated with the end user such as their blood type, known allergies, and current drug prescriptions. In one embodiment, the first computing device may comprise a server in the cloud associated with the first person, such as server 15 in FIG. 1. In this case, although the first person may be within a distance of the origin device, the first computing device need not necessarily be located within the distance of the origin device.

In step 542, a second set of personalized information associated with a second virtual billboard is acquired from the first computing device. In one embodiment, the second set of personalized information may be transmitted to the origin device in response to the first set of personalized information. A second set of formatting information associated with the second virtual billboard may also be acquired from the first computing device. The second virtual billboard may include personalized information associated with the first person. For example, the second set of formatting information may include information associated with the first person such as shopping lists, classified advertisements, personal advertisements, languages spoken, age, relationship status, allergies, and blood type.

In step 544, the second set of personalized information is searched for matches with the first set of personalized information. In one embodiment, a keyword search is performed on the second set of personalized information based on information contained within the first set of personalized information. In another embodiment, a keyword search is performed on the second set of personalized information based on a list of keywords stored in a user profile associated with the end user of the origin device. Keyword matches may be highlighted within the second virtual billboard. In some embodiments, the second set of personalized information may be searched subject to searching criteria. The searching criteria may include items sought for by the end user of the origin device. The searching criteria may include characteristics of people sought for by the end user of the origin device (e.g., a person who speaks Spanish, is single, and has studied an engineering discipline). In some cases, the second virtual billboard may be displayed on the origin device only if one or more keyword matches are found or if one or more searching criteria are satisfied.

In step 546, the second virtual billboard is generated based on the second set of personalized information and the second set of formatting information. In step 548, a location for the second virtual billboard within a field of view of the origin device is determined. In one embodiment, the location of the second virtual billboard within a field of view of the origin device may be determined based on a location of the first person within the field of view (e.g., the virtual billboard may hover over the first person or to the side of the first person). The location of the second virtual billboard may also be determined based on the presence of other persons within the field of view (e.g., the virtual billboard may be placed such that it does not obstruct a view of another person's face while they are in a conversation with the end user).

In step 550, one or more images corresponding with the second virtual billboard are rendered and displayed on the origin device. The one or more images corresponding with the second virtual billboard may be rendered and displayed such that the second virtual billboard is perceived to exist within an augmented reality environment displayed to the end user of the origin device at the location determined in step 548.

Figure 5C:
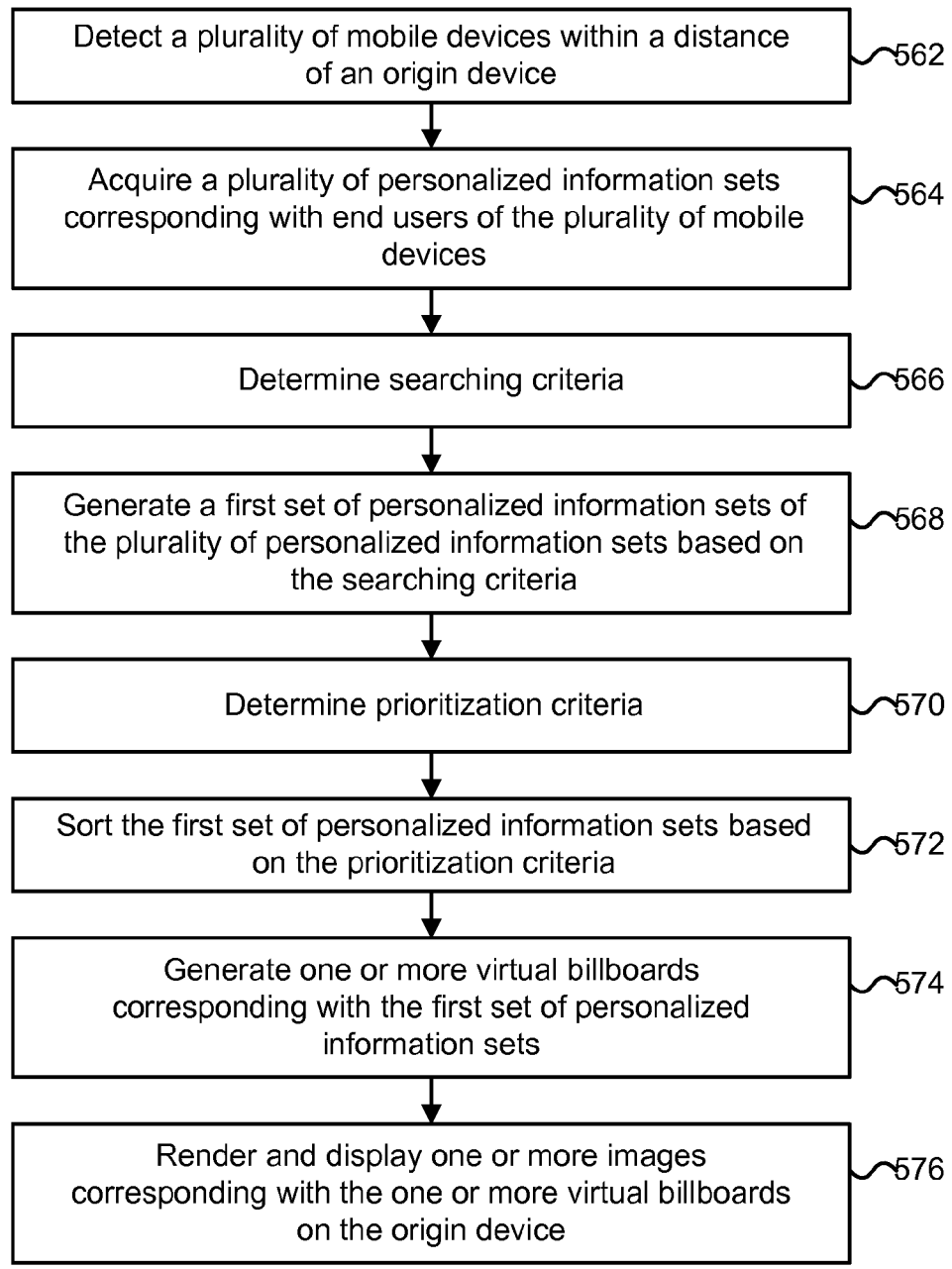
FIG. 5C is a flowchart describing an alternative embodiment of a method for generating and displaying personalized virtual billboards within an augmented reality environment.

FIG. 5C is a flowchart describing an alternative embodiment of a method for generating and displaying personalized virtual billboards within an augmented reality environment. In one embodiment, the process of FIG. 5C may be performed by a mobile device, such as mobile device 19 in FIG. 1.

In step 562, a plurality of mobile devices within a distance of an origin device is detected. The origin device may comprise an HMD. The plurality of mobile devices may be detected within the distance of the origin device via GPS coordinates associated with the plurality of mobile devices. In one embodiment, the plurality of mobile devices may correspond with a plurality of device identifiers. Each of the plurality of mobile devices may be located within a field of view of the origin device and within a wireless range of the origin device. Each of the plurality of mobile devices may be associated with a person at a party or other grouping of persons (e.g., a business meeting or a social gathering).

In step 564, a plurality of personalized information sets corresponding with end users of the plurality of mobile devices is acquired. Each set of the plurality of personalized information sets may include information associated with a particular person such as shopping lists, classified advertisements, personal advertisements, languages spoken, age, relationship status, allergies, and blood type. In step 566, searching criteria is determined. The searching criteria may include items sought for by the end user of the origin device. The searching criteria may include characteristics of people sought for by the end user of the origin device (e.g., a person who speaks Spanish, is single, and has studied an engineering discipline). In step 568, a first set of personalized information sets of the plurality of personalized information sets is generated based on the searching criteria. The first set of personalized information sets may comprise personalized information sets that satisfy the searching criteria determined in step 566.

In step 570, prioritization criteria is determined. The prioritization criteria may allow personalized information sets (e.g., each corresponding with a different virtual billboard) to be ordered and/or sorted based on various prioritization criteria such as a distance from the origin device to a particular person and the number of searching criteria for which matches were found in the personalized information set. In step 572, the first set of personalized information sets is sorted based on the prioritization criteria. In one embodiment, the first set of personalized information sets corresponds with a group of persons at a party and may be sorted in real-time such that only virtual billboards associated with persons within a particular distance of the origin device and satisfy certain searching criteria are displayed to the end user of the origin device.

In step 574, one or more virtual billboards corresponding with the first set of personalized information sets are generated. In step 576, one or more images corresponding with the one or more virtual billboards are rendered and displayed on the origin device. The one or more images corresponding with the one or more virtual billboards may be rendered and displayed such that the one or more virtual billboards are each perceived to exist within an augmented reality environment displayed to the end user of the origin device.

One embodiment of the disclosed technology includes a see-through display in communication with the one or more processors. The one or more processors detect a first mobile device within a distance of the electronic device, determine a classification level for a first person associated with the first mobile device, generate one or more searching criteria based on the classification level, acquire a second set of personalized information associated with a second virtual billboard from the first mobile device, determine whether the second set of personalized information satisfies the one or more searching criteria, generate the second virtual billboard based on the second set of personalized information in response to determining that the second set of personalized information satisfies the one or more searching criteria, and render one or more images corresponding with the second virtual billboard. The see-through display displays the one or more images such that the second virtual billboard is perceived to exist within the augmented reality environment.

One embodiment of the disclosed technology includes detecting a first mobile device within a distance of an origin device, identifying a classification level of a first person associated with the first mobile device, generating one or more searching criteria based on the classification level, and acquiring a second set of personalized information associated with a second virtual billboard from the first mobile device. The second set of personalized information is associated with the first person. The method further comprises determining whether the second set of personalized information satisfies the one or more searching criteria, generating the second virtual billboard based on the second set of personalized information in response to determining that the second set of personalized information satisfies the one or more searching criteria, rendering one or more images corresponding with the second virtual billboard, and displaying the one or more images on the origin device.

One embodiment of the disclosed technology includes detecting one or more computing devices within an environment. The one or more computing devices include a first mobile device. The method further comprises determining a classification level for a first person associated with the first mobile device, generating one or more searching criteria based on the classification level, and acquiring a second set of personalized information associated with a second virtual billboard from the first mobile device. The second set of personalized information is associated with the first person. The method further comprises acquiring a second set of formatting information associated with the second virtual billboard from the first mobile device, determining whether the second set of personalized information satisfies the one or more searching criteria, generating the second virtual billboard based on the second set of personalized information and the second set of formatting information in response to determining that the second set of personalized information satisfies the one or more searching criteria, rendering one or more images corresponding with the second virtual billboard, and displaying the one or more images on the origin device.

Figure 6:
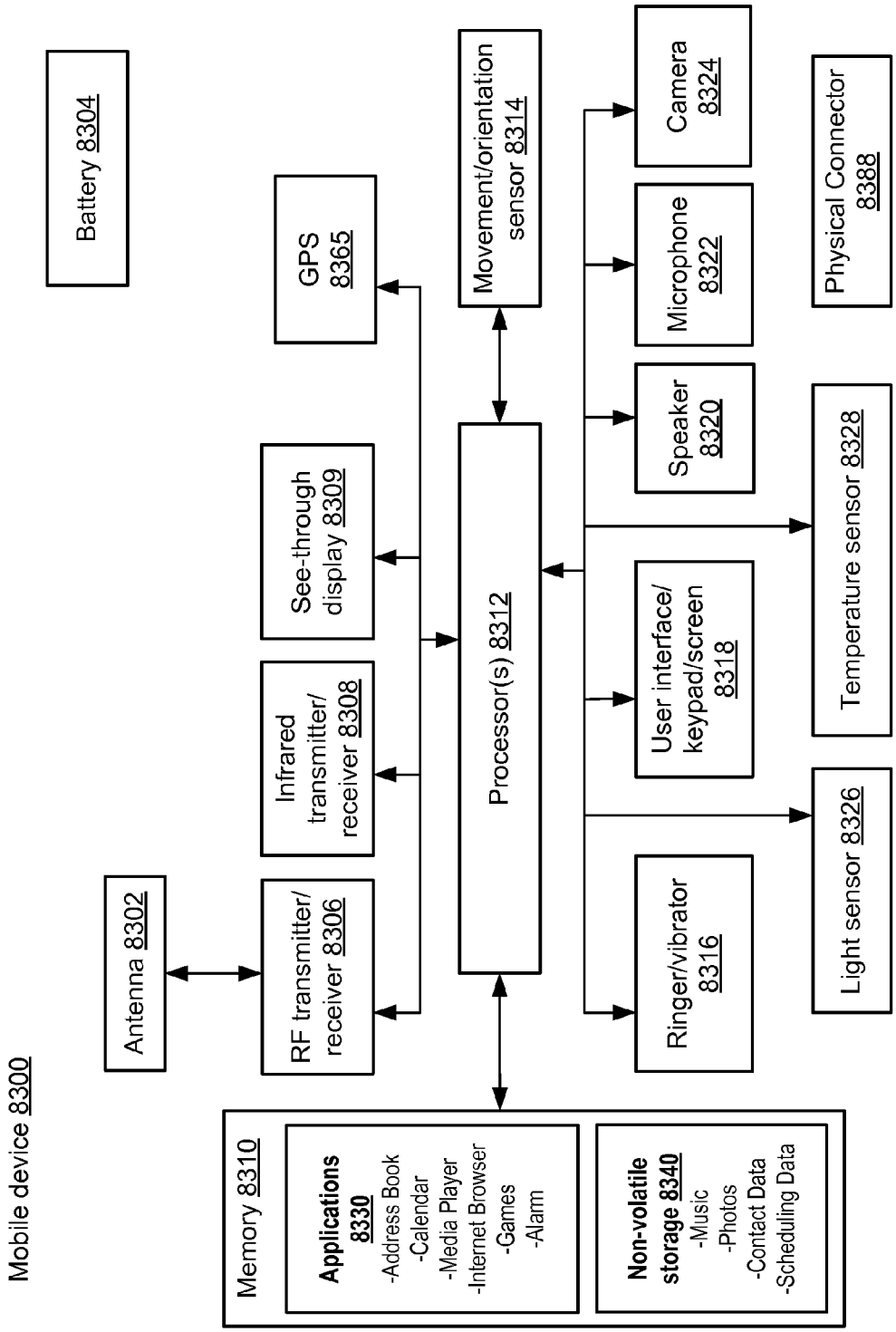
FIG. 6 is a block diagram of one embodiment of a mobile device.

FIG. 6 is a block diagram of one embodiment of a mobile device 8300, such as mobile device 19 in FIG. 1. Mobile devices may include laptop computers, pocket computers, mobile phones, HMDs, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

The disclosed technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A head-mounted display device for generating and displaying personalized virtual billboards within an augmented reality environment, comprising:
one or more processors configured to detect that a first mobile device is within a distance of the head-mounted display device and determine a classification level for a first person associated with the first mobile device in response to detecting that the first mobile device is within the distance of the head-mounted display device, the classification level corresponds with whether the first person is classified as a friend of an end user of the head-mounted display device or is classified as being unknown to the end user of the head-mounted display device, the one or more processors configured to generate one or more searching criteria based on the classification level and determine whether a set of personalized information acquired from the first mobile device satisfies the one or more searching criteria, the one or more processors configured to generate a virtual billboard based on the set of personalized information in response to determining that the set of personalized information satisfies the one or more searching criteria, the one or more processors configured to detect that a second person different from the first person is within a field of view of the head-mounted display device and determine a position for the virtual billboard within a field of view of the head-mounted display device such that the virtual billboard does not obstruct a view of a portion of the second person within the field of view, the one or more processors configured to render one or more images corresponding with the virtual billboard located at the position within the field of view; and
a display in communication with the one or more processors, the display configured to display the one or more images such that the virtual billboard is perceived to exist within the augmented reality environment.

2. The head-mounted display device of claim 1, wherein:
the one or more processors configured to acquire a set of formatting information associated with the virtual billboard from the first mobile device and generate the virtual billboard based on the set of personalized information and the set of formatting information.

3. The head-mounted display device of claim 1, wherein:
the one or more processors configured to determine whether the set of personalized information satisfies the one or more searching criteria by determining whether the set of personalized information includes a listing associated with an online classified advertisement.

4. The head-mounted display device of claim 1, wherein:
the one or more processors configured to determine whether the set of personalized information satisfies the one or more searching criteria by determining whether the set of personalized information includes one or more personal characteristics.

5. The head-mounted display device of claim 1, wherein:
the set of personalized information includes at least one of a relationship status of the first person or a blood type of the first person.

6. The head-mounted display device of claim 1, wherein:
the portion of the second person comprises a face of the second person.

7. A method for generating and displaying personalized virtual billboards within an augmented reality environment, comprising:
detecting that a first mobile device is within a distance of an origin device, the origin device comprises a head-mounted display device;
determining a classification level of a first person associated with the first mobile device, the classification level corresponds with whether the first person is classified as a friend of an end user of the origin device or is classified as being unknown to the end user of the origin device;
generating one or more searching criteria based on the classification level;
acquiring a set of personalized information associated with a virtual billboard from the first mobile device;
detecting that the set of personalized information satisfies the one or more searching criteria;
generating the virtual billboard based on the set of personalized information in response to detecting that the set of personalized information satisfies the one or more searching criteria;
detecting that a second person different from the first person is within a field of view of the origin device;
determining a position for the virtual billboard within a field of view of the origin device such that the virtual billboard does not obstruct a view of a portion of the second person within the field of view;

rendering one or more images corresponding with the virtual billboard located at the position within the field of view using the origin device; and displaying the one or more images using the origin device.

8. The method of claim 7, further comprising:
acquiring a set of formatting information associated with the virtual billboard from the first mobile device, the generating the virtual billboard includes generating the virtual billboard based on the set of personalized information and the set of formatting information.

9. The method of claim 7, wherein:
the detecting that the set of personalized information satisfies the one or more searching criteria includes determining whether the set of personalized information includes a listing associated with an online classified advertisement.

10. The method of claim 7, wherein:
the detecting that the set of personalized information satisfies the one or more searching criteria includes determining whether the set of personalized information includes one or more personal characteristics.

11. The method of claim 7, wherein:
the detecting that the first mobile device is within a distance of an origin device includes identifying the first person within a field of view of the origin device and determining that the first person is within the distance of the origin device.

12. The method of claim 7, wherein:
the set of personalized information includes at least one of a relationship status of the first person or a blood type of the first person.

13. The method of claim 7, wherein:
the portion of the second person comprises a face of the second person.

14. One or more processor readable storage devices containing processor readable code for programming one or more processors to perform a method for generating and displaying personalized virtual billboards within an augmented reality environment comprising the steps of:
acquiring a GPS location associated with a first mobile device;
detecting that the first mobile device is within a distance of a head-mounted display device based on the GPS location of the first mobile device;
determining a classification level for a first person associated with the first mobile device in response to detecting that the first mobile device is within the distance of the head-mounted display device, the classification level corresponds with whether the first person is classified as a friend of an end user of the head-mounted display device or is classified as being unknown to the end user of the head-mounted display device;
generating one or more searching criteria based on the classification level;

acquiring a second set of personalized information associated with a second virtual billboard from the first mobile device, the second set of personalized information is associated with the first person;
acquiring a second set of formatting information associated with the second virtual billboard from the first mobile device, the second set of formatting information dictates how the second virtual billboard is displayed on the head-mounted display device;
determining whether the second set of personalized information satisfies the one or more searching criteria;
generating the second virtual billboard based on the second set of personalized information and the second set of formatting information in response to determining that the second set of personalized information satisfies the one or more searching criteria;
detecting that a second person different from the first person is within a field of view of the head-mounted display device;
determining a position for the second virtual billboard within a field of view of the head-mounted display device such that the second virtual billboard does not obstruct a view of either a portion of the second person within the field of view or a portion of the first person within the field of view;
rendering one or more images corresponding with the second virtual billboard located at the position within the field of view; and
displaying the one or more images using the head-mounted display device.

15. The one or more processor readable storage devices of claim 14, wherein:
the determining whether the second set of personalized information satisfies the one or more searching criteria includes determining whether the second set of personalized information includes a listing associated with an online classified advertisement.

16. The one or more processor readable storage devices of claim 14, wherein:
the determining whether the second set of personalized information satisfies the one or more searching criteria includes determining whether the second set of personalized information includes one or more personal characteristics.

17. The one or more processor readable storage devices of claim 14, wherein:
the second set of personalized information includes at least one of a relationship status of the first person or a blood type of the first person.

18. The one or more processor readable storage devices of claim 14, wherein:
the portion of the second person comprises a face of the second person.

* * * * *